No. 796,821. PATENTED AUG. 8, 1905.
R. A. DANGLER.
SWITCHBOARD FOR METER TESTS.
APPLICATION FILED DEC. 9, 1904.
2 SHEETS—SHEET 1.
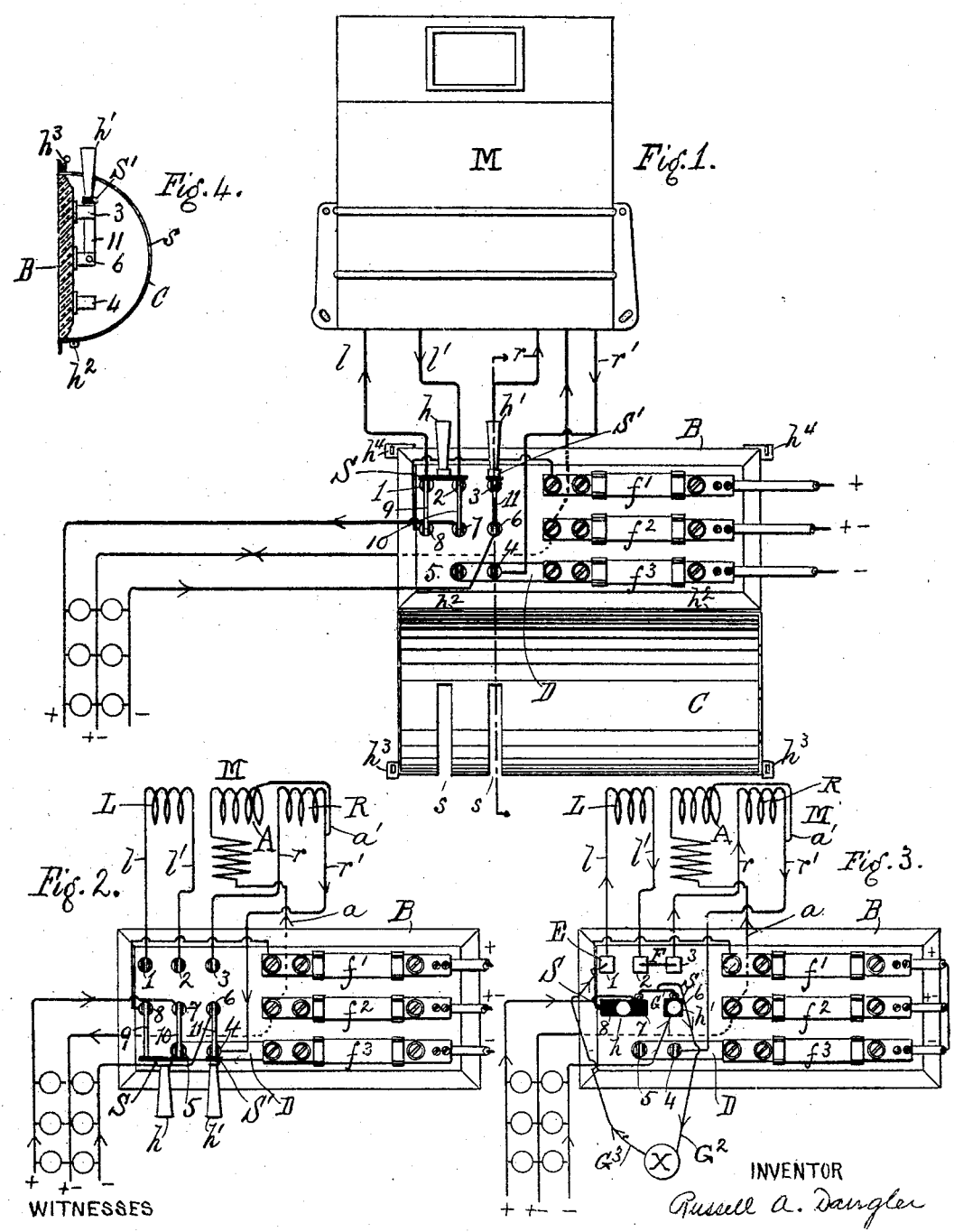
WITNESSES
M. H. Woodruff
Walter Abbe
INVENTOR
Russell A. Dangler
BY
Howson and Howson
ATTORNEYS No. 796,821. PATENTED AUG. 8, 1905.
R. A. DANGLER.
SWITCHBOARD FOR METER TESTS.
APPLICATION FILED DEC. 9, 1904.
2 SHEETS—SHEET 2.
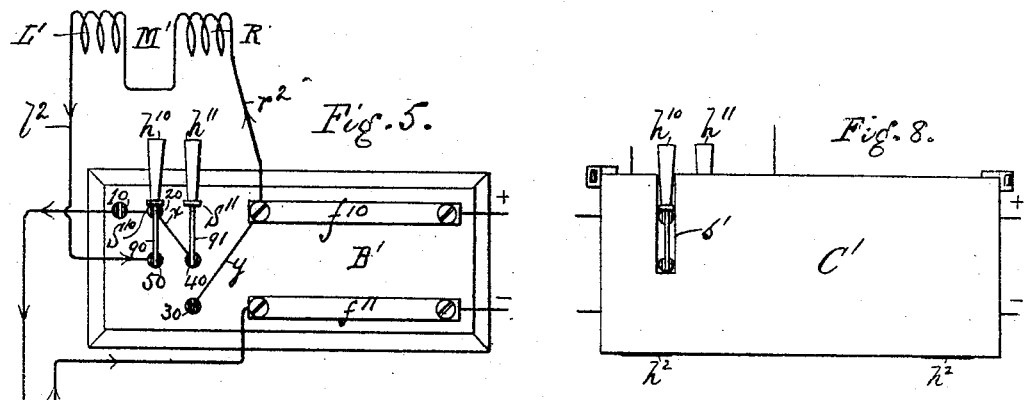
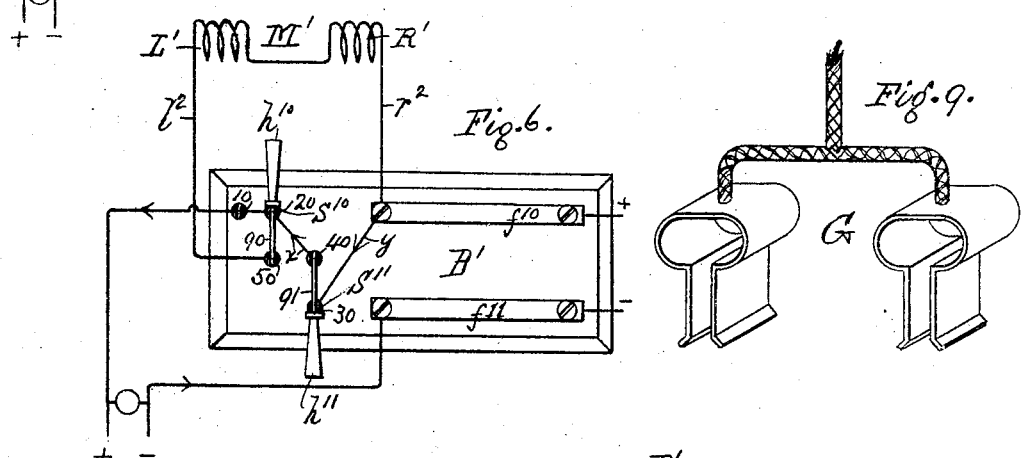
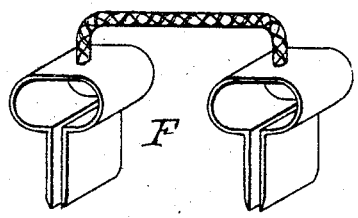
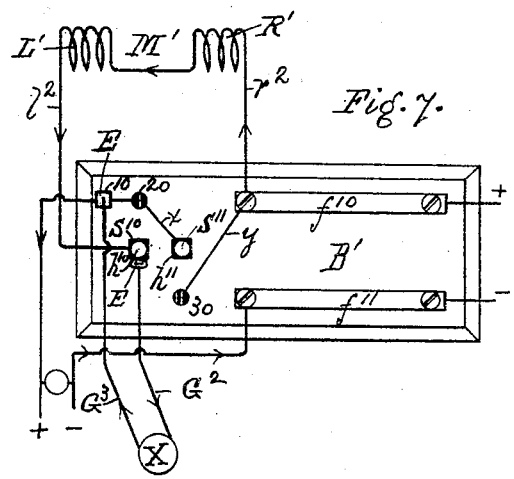
WITNESSES
M. H. Woodruff
Walter Abbe
INVENTOR
Russell A. Dangler
BY
Howson and Howson
ATTORNEYS

UNITED STATES PATENT OFFICE.

RUSSELL A. DANGLER, OF NEW YORK, N. Y.

SWITCHBOARD FOR METER TESTS.

No. 796,821.  Specification of Letters Patent.  Patented Aug. 8, 1905.

Application filed December 9, 1904. Serial No. 236,154.

*To all whom it may concern:*

Be it known that I, RUSSELL A. DANGLER, a citizen of the United States of America, residing in the borough of Manhattan, in the city, county, and State of New York, have invented an Improved Switchboard for Meter Tests, of which the following is a specification.

The object of my invention is to provide an improved means for testing electric meters which will prevent any material break in continuity of supply to the consumer and enable the test man to make his standard-instrument connections expeditiously and without jarring the meter during the test.

A further object of my invention is to insure against wrong connections being left after the test.

These objects I attain by the use of suitable switches and connections, preferably contained within a peculiar inclosing box, to which connections the service-conductors, meter-conductors, and house-wires are attached and to certain of which connections portable clips or contact-pieces, hereinafter described, may be applied to serve as connecting means between the standard measuring-meter (or ordinary ammeter when the test is performed by a voltmeter and ammeter) and the meter to be tested.

In the accompanying drawings, Figure 1 is a face view of my improved switchboard as in service position for a three-wire system, but with the cover open. Fig. 2 is a diagrammatic plan of the connections when made ready for a test and before the testing-clips have been applied. Fig. 3 is a view similar to Fig. 2, but with all connections made for a test. Fig. 4 is a sectional elevation of switchboard and cover. Fig. 5 is a diagrammatic view of a two-wire switchboard of my invention in service position. Fig. 6 is a view similar to Fig. 5, but with the switches in position preparatory to making test connections. Fig. 7 is a view of the same board of Fig. 5 after connection and during test. Fig. 8 is a view of the same with the cover in place. Fig. 9 is a perspective view of a double portable contact-clip for the testing instrument. Fig. 10 is a perspective view of a portable bridge, and Fig. 11 is a view of a single portable clip for the testing instrument.

In ordinary three-wire house installations the meter contains right and left low-resistance fields, one in series with one side of the house-wiring and the other in series with the other side of the house-wiring, and between these fields a high-resistance armature rotates, receiving its current directly from the service-conductors, and hence maintaining a field constant with the electromotive force of said service-conductors. When it is desired to test such a meter, a current-measuring instrument must be placed in series with said meter and between it and the points of consumption. This must be done without changing the direction of flow through the field-coils of the meter. It may be done by connecting adjacent conductors of the two coils, first disconnecting them from all other electrical connections, disconnecting one of the remaining two conductors and securing it to one of the testing-leads, the other lead being connected to both main conductors of the wires of the house side of the system. Such an operation results during test in putting meter, instrument, and house-current-consuming apparatus (which I will hereinafter refer to as "lamps") on a temporary two-wire circuit, in which the test may be carried out with one set of readings for both sides of the field of the meter. The operation as thus performed is clumsy, because many connections must be broken, made, and again broken and remade, resulting in temporary absence of current in the lamps, mutilation of connections, and often material damage to the adjacent meter through vibration caused in making and breaking connections.

As shown in Figs. 1 to 4, inclusive, my improvement is particularly applicable to a lighting installation on the three-wire system. The apparatus in normal condition is as shown in Fig. 1, the cover C, however, being closed and locked or sealed and not open, as shown in that figure. Above the insulating-base B the meter M is secured to the wall or some adjacent stationary object. The $+$ $+$ $-$ and $-$ service-conductors lead into the terminals of fuses $f'$, $f^2$, and $f^3$, respectively, the fuse $f^3$ having a metal contact-strip D, secured to the base B. Two knife-blade switches S S' are mounted on the base B in pivotal contact-clips 8, 7, and 6 for their respective blades 9, 10, and 11. The switch S may conveniently be a two-pole switch with the ordinary handle $h$, while the switch S' may be a single-pole switch provided with a handle $h'$. To the base B near its upper edge I attach spring contact-clips 1 2, adapted to be contacted by the blades 9 and 10 of the two-pole switch S. A spring contact-clip 3 is located near the same upper edge of the switch, adapted to be contacted by the blade 11 of the single-pole switch S'. Two spring contact-clips 4 5 are mounted on the contact-strip D, contact-clip 4 being adapted to be engaged by the blade 11 of the switch S', while contact 5 is adapted to be engaged by the blade 10 of switch S. The house side of the fuse $f'$ is connected by a conductor $f$ to the pivotal contact-clip 8, the pivotal contact-clip 7 being connected to the $+$ house-wire. The pivotal contact-clip 6 is connected to the $-$ house-wire, while the $+-$ house-wire is connected with the house side of the fuse $f^2$ of the service-conductor $+-$.

The meter to be tested in ordinary form is composed of two coils L R, one located at the right of an armature A and the other at the left of said armature, the coil L being connected with the contact-clips 1 2 by the legs $l\ l'$, respectively, while the leg $r$ of the coil R is connected to the contact-clip 3, the leg $r'$ being connected with the contact-strip D. The armature A is connected directly across the $+-$ service-conductor and one of its mates—the $-$ conductor in the example shown—by conductors $a\ a'$, the conductor $a'$ being joined to the conductor $r'$, before referred to. In the normal position of Fig. 1 the current flows from the $+$ service-conductor through fuse $f'$, through conductor $f$ to pivotal clip 8, switch-blade 9, contact-clip 1, leg $l$, coil L, leg $l'$, contact-clip 2, blade 10, pivotal clip 7, $+$ house-wire, through the lamps or other translating devices, returning through the $+-$ house-wire to fuse $f^2$ to service-conductor $+-$, while the difference of potential when existing between $+-$ service-conductor and $-$ service-conductor causes the following circuit to be established: service-conductor $+-$, fuse $f^2$, house-wire $+-$, $-$ house-wire, pivotal clip 6, switch-blade 11, spring contact-clip 3, leg $r$, coil R, leg $r'$, contact-strip D, fuse $f^3$ to $-$ service-conductor.

When the test man wishes to test the meter M, he throws the switches S S' into the position of Fig. 2, thereby cutting out both coils of the meter, while not affecting the potential through the armature A, and at the same time placing the house-wires on a two-wire circuit, which is as follows: from $+-$ service-conductor, fuse $f^2$, $+-$ house-wire, from which point the circuit divides, one-half passing through lamps and $-$ house-wire to contact-clip 6, switch-blades 11, clip 4, and strip D, while the other side passes through lamps and $+$ house-wire, clip 7, blade 10, and clip 5 to the same strip D, then to the fuse $f^3$ and $-$ service-conductor, in which position it will be obvious no meter-reading will be obtained. The test man now places a bridge-clip F across the clips 2 3. Such bridge may be composed of two sets of spring-blades (see Fig. 11) adapted to fit in between the spring-blades of the clip as would a switch-blade. He also secures to his ammeter X or to the field of an ordinary standard meter two conductors $G^2\ G^3$. To the end of the conductor $G^2$ the portable bridge-clip H of Fig. 9 is electrically connected, while the single clip E of Fig. 11 is attached to the terminal of the conductor $G^3$. The single clip is inserted into the contact-clip 1 in similar manner to that in which the bridge F was inserted into the clips 2 3. The bridge G, attached to the conductor $G^2$, is sprung into contact with the blades 10 11 of the switches S S', and when these connections are solidly and surely made the test man throws the switch-handles $h\ h'$ into the position of Fig. 3, the blades of the switch being free of all stationary contact-clips. The circuit still remains a two-wire one; but it is as follows: from $+-$ service-conductor and fuse $f^2$ to house-wire $+-$, where it divides, as before described, $-$ house-wire being connected to the clip 6, switch-blade 11, and bridge-clip G, while $+$ house-wire is connected to the clip 7, blade 10 and bridge-clip G, where it unites, flows through the conductor $G^2$, test instrument X, conductor $G^3$, clip E, contact-clip 1, leg $l$ of coil L, leg $l'$, contact-clip 2, branch F, contact-clip 3, leg $r$ of coil R, leg $r'$, to strip D, fuse $f^3$, and $-$ service-conductor. The operator in selecting these three different paths has at no time interrupted the supply of current to the installation, except while throwing the switches S S' from the position of Fig. 1 to that of Fig. 2, which may be so momentary that the lights within the building are scarcely affected. The object in maintaining the coil A of the meter always bridged across the service-terminals is that its normal temperature may always be maintained before, during, and after the test. When in the position of Fig. 3, the test man may take any desired readings with his standard instrument and compare it with the meter of the installation, and thus discover its percentage of inaccuracy and correct the same in the usual manner.

In order that a careless test man or meddlers in a building may be deterred from placing the switches in the position of Fig. 2, and thereby secure current without metering it, and at the same time to allow of the switches S S' being used to protect the circuit if need arises, I hinge at $h^2\ h^2$ a cover C, having slots $s\ s$ extending, as shown in Fig. 4, to the longitudinal center of the cover and open from one edge of the same and adapted to permit the handles $h\ h'$ of the switches to be manipulated and moved from the position of Fig. 1 to that of Fig. 3, but no farther. This cover when left by the test man should be locked at $h^3\ h^4$ or sealed in the ordinary manner. The test man cannot close this cover with the switches left in the position of Fig. 2, for in that position the handles $h\ h'$ will not register with the slots $s\ s$.

When metering current on a two-wire system, particularly where motors are to be protected, I modify my device, as shown in Figs. 5 to 8, inclusive, in which case base B' is provided with clips 10, 20, and 30, clip 10 and clip 20 being near the upper edge of the base, while clip 30 is near the lower edge. A single-pole switch $S^{10}$ is adapted to connect its pivotal contact-post 50 with the clip 20, while switch $S^{11}$ is adapted to contact its post 40 with clip 30. In normal position clip $S^{10}$ only is in operative position. A conductor from the + service-conductor is connected with the clip 30, while a wire $x$ leads from clip 20 to post 40 and from clip 20 to clip 10 and thence to + house-wire, the − house-wire being connected to fuse $f^3$ and − service-conductor. In these views I have not illustrated the armature of the meter, which will be connected in precisely the same manner as in the figures first described. The current in normal position enters at + service-conductor through the leg $r^2$ of the coil R of the meter M', through the coil L', leg $l^2$, to the post 50, switch-blade 90, post 20, conductor $x$, clip 10, + house-wire, through the meter, − house-wire, and fuse 11 to − service-conductor. The switch $S^{11}$ is provided principally so that no break in the current will be caused by the test, and for this purpose it is actuated in advance of the switch $S^{10}$, cutting out entirely the coils of the meter M', through the terminals of the fuse $f^{10}$, clip 30, blade 91, post 40, conductor $x$, and house-wire, the rest of the circuit being obvious. When in the position of Fig. 6, the measuring instrument X, with its conductors $G^2 G^3$, is brought into play, its terminals being provided with single clips, such as illustrated in Fig. 11, one of which is caused to straddle blade 90 of the switch $S^{10}$ and the other is inserted into contact-clip 10, which otherwise is a blind contact-clip. The test man then moves both switches into position perpendicular to the base, when the current will be directed from the service-conductor through the meter-coils, post 50, blade 90, clip and conductor $G^2$, measuring instrument X, conductor $G^3$, clip E, contact-clip 10, + house-wire, − house-wire, fuse $f^{11}$ to − service-conductor, the change having been effected without even momentarily breaking the circuit. The readings may be taken in the ordinary manner. The cover C', adapted to this type of switchboard, should have but one slot $s'$ for the switch $S^{10}$ in order to prevent the meter-short-circuiting switch $S^{11}$ being operated by any one save the test man or other authorized representative, while the switch $S^{10}$ may be available to cut out the entire installation.

I claim as my invention—

1. A switchboard for meter-testing, comprising switch means for cutting out the meter substantially without stopping the current-flow, and means for inserting a testing instrument in the gap thus formed, said switch means adapted upon further manipulation to cut in both instrument and meter.

2. Service-conductors of an electric-lighting system, house-wires, current-consuming devices, and a meter between said devices and the service-conductors, in combination with switch means and points of contact therefor, said switch means adapted to be thrown to change the relationship of the meter to the system without more than momentarily stopping the current-flow, a testing instrument and leads therefor adapted to be connected with said switch means, without altering the electrical conditions, and so connected that upon a second movement of the switch means the testing instrument and meter will both be cut in without stopping the current-flow.

3. Switch mechanism for cutting in a meter-testing instrument, comprising switch means and clips therefor, the instrument and its leads, the service-meter, clips with which the switch means may be contacted to cut out the service-meter, said leads when the switch is in aforesaid position being adapted to be connected to certain clips, said switch means adapted to be then thrown to cut in both testing instrument and service-meter.

4. Switch mechanism for cutting in a meter-testing instrument, comprising switch means and clips therefor, the instrument and its leads, the service-meter, clips with which the switch means may be contacted to cut out the service-meter, said leads when the switch is in aforesaid position being adapted to be connected to certain clips, said switch means adapted to be then thrown to cut in both testing instrument and service-meter, in combination with a cover having slots for the handles of said switch means.

5. A switch mechanism for cutting in and out a service-meter and testing instrument, comprising one switch adapted to cut out the meter and a second switch, instrument-leads connected between the open blade thereof and its clip, in combination with temporary switch-contact clips for cutting out the meter during the attachment of said leads.

6. A switch mechanism for cutting in and out a service-meter and testing instrument, comprising means for cutting out the service-meter, electrical contact-points to which the testing instrument may be connected to thus connect it in series with said meter and means for then cutting in the meter and instrument, the instrument-leads having spring-clips.

7. A switch mechanism, comprising a switch means, and a normal clip therefor, a service-conductor and meter and a normal connection from the clip through said meter and service-conductor, a temporary clip through which said meter alone may be cut out from said series, a testing instrument and leads therefor adapted to connect between a permanent clip and said switch mechanism, whereby upon breaking the temporary connection said instrument and meter will be included in the circuit.

8. Service-conductors of an electric-lighting system, house-wires, current-consuming devices, a meter between said devices and service-conductors, switches and switch-clips, the switches adapted to be operatively placed in three positions, first to connect the service-conductors, service-meter and devices in circuit, second to cut out meter and supply current to said devices, a testing-meter and its leads, which in said second position may be attached without destroying such supply, and a third position in which said testing-meter, service-meter and conductors and devices will all be in circuit.

9. A service-meter, three-wire service-conductors, house-wires, and meter-coils in circuit therewith, switches normally between the coils and outside wires of the house, and temporary contacts and connections for the switches adapted when in use to cut out the meter from the normal switch-contacts and to place both outside conductors in connection with the same service-conductor, a testing instrument and its leads adapted to connect the instrument and meter in series when connected between the switches and normal clips, and to automatically connect the same in series with the house-wires when switch-contact is broken with the temporary contacts.

10. A three-wire system, having a meter, a pair of switches, normal and temporary contacts therefor, a testing instrument, and its leads and connections, said switches when contacting with normal contacts directing the current consumed through the meter, when contacting with temporary contacts cutting out the meter, the testing-leads and connections being adapted to connect up said cut-out portion without causing a current-flow when so doing, said switches when in a position between normal and temporary contacts adapted to direct current through both instruments and meter.

11. A switchboard for three-wire meter-testing, comprising switch means for cutting out the meter substantially without stopping the current-flow, said switch means at the same time adapted to translate the house system into a temporary two-wire system, means for inserting a testing instrument in series with both sides of the meter and to fill the gap thus formed, said switch means upon further manipulation adapted to cut in both instrument and meter in said temporary two-wire system.

12. A switchboard for meter-testing, having knife switch-blades and spring contact-clips, a testing instrument and leads, a spring-clip for one lead adapted to straddle a switch-blade and the other adapted to fit within a spring-clip, said switches having three successive operative positions, one with the meter in circuit, two with the meter cut out, and three with the aforesaid leads connected as aforesaid with both meter and instrument in circuit.

13. A switchboard for three-wire meter-testing, comprising a base, a pair of knife-blade switches thereon, pivotal clips and spring-clips therefor, one line of said spring-clips being connected to a service-conductor, the other line being connected to the meter so that upon raising the switches, each side of the meter will be cut off from the other and also from the house-wires, the outside house-wires being connected to the pivotal clips, a testing instrument, a pair of spring-clips on one of its leads adapted to be secured to a blade of each pair of knife-blades, the other lead adapted to be grasped in one of the clips connected to the meter, and a pair of connected clips adapted to connect at the spring-clips the two opened sides of the meter-coils.

14. A switchboard comprising switch mechanisms with separately-used sets of contacts, a testing instrument and its leads, a connecting-clip E, a meter having right and left coils and leads, three service-wires and three house-wires, the outside house-wires connected to said switch mechanisms, the meter-leads of each coil connected separately to contacts of one set, the neutral house-wire connected to the neutral service-wire, the other service-wires connected to the aforesaid set of contacts and one of them to contacts of the other set, said connecting-clip E being adapted to join two contacts with which separate meter-coils are connected and the instrument-leads to connect the switch mechanism and a meter-lead when neither set of contacts are in contact with the switch mechanism, to maintain a circuit.

15. A meter, right and left coils, and two leads to each coil, a neutral service-conductor and a connected neutral house-wire, a pair of switches, to each of which outside house-wires are connected a service-conductor connected to one switch, the other service-conductor connected to a set of temporary switch-clips and to a lead of one meter-coil, three normal switch-clips, a lead of the aforesaid coil connected to one of them, the leads of the other coil connected to the other two clips, a testing instrument and its leads, connecting-clip E, said clip adapted to connect the two coils at their clip connections, the instrument-leads adapted to connect the switches with the unconnected meter-coil not connected by aforesaid connecting-clip, when said switches have been moved out of normal position.

In testimony whereof I have signed my name to this specification in the presence of two subscribing witnesses.

RUSSELL A. DANGLER.

Witnesses:
 FRANK A. BUTLER,
 HUBERT HOWSON.